(12) United States Patent
Bin et al.

(10) Patent No.: US 12,444,970 B2
(45) Date of Patent: Oct. 14, 2025

(54) MULTI-INPUT CHARGING SYSTEM AND METHOD USING MOTOR DRIVING DEVICE

(71) Applicants: Hyundai Motor Company, Seoul (KR); Kia Corporation, Seoul (KR)

(72) Inventors: Seung Hyeon Bin, Hwaseong-si (KR); Seong Min Kim, Changwon-si (KR); Sang Jin Heo, Seongnam-si (KR); Tae Il Yoo, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 577 days.

(21) Appl. No.: 17/868,264

(22) Filed: Jul. 19, 2022

(65) Prior Publication Data

US 2023/0253818 A1    Aug. 10, 2023

(30) Foreign Application Priority Data

Feb. 7, 2022    (KR) .......................... 10-2022-0015592

(51) Int. Cl.
*H02J 7/14*    (2006.01)
*H02J 7/24*    (2006.01)

(52) U.S. Cl.
CPC .......... *H02J 7/2434* (2020.01); *H02J 7/1446* (2013.01); *H02J 2207/20* (2020.01)

(58) Field of Classification Search
None
See application file for complete search history.

(56) References Cited

U.S. PATENT DOCUMENTS

| 2006/0082935 A1* | 4/2006 | Lai ................... H02M 3/33571 |
| | | 361/18 |
| 2013/0147431 A1* | 6/2013 | Lim ......................... H02J 7/02 |
| | | 320/109 |
| 2020/0161878 A1* | 5/2020 | Niimi ................... H02J 7/0016 |

FOREIGN PATENT DOCUMENTS

| JP | 6087666 B2 | 3/2017 |
| JP | 6773365 B2 | 10/2020 |
| KR | 10-2019-0119778 A | 10/2019 |
| KR | 10-2020-0068175 A | 6/2020 |
| KR | 10-2020-0075937 A | 6/2020 |
| KR | 10-2020-0116580 A | 10/2020 |
| KR | 10-2022-0062832 A | 5/2022 |

* cited by examiner

*Primary Examiner* — Arun C Williams
(74) *Attorney, Agent, or Firm* — Morgan, Lewis & Bockius LLP

(57) ABSTRACT

A multi-input charging system and method using a motor driving device: the system includes a first inverter including a plurality of first switching elements, a second inverter including a plurality of second switching elements, a battery connected to a charging power input terminal or one end of the second inverter through a charging switch, and a controller configured to directly charge the battery through the charging power input terminal by selectively connecting the charging switch when a battery charging mode is started, and when connection of the charging switch is impossible, control the first switching elements and the second switching elements such that the charging power input terminal and the battery are connected through the first inverter, a motor, and the second inverter in a bypass manner.

10 Claims, 11 Drawing Sheets

MULTI-INPUT CHARGING SYSTEM AND METHOD USING MOTOR DRIVING DEVICE

CROSS-REFERENCE TO RELATED APPLICATION

This application claims the benefit of priority to Korean Patent Application No. 10-2022-0015592, filed on Feb. 7, 2022 in the Korean Intellectual Property Office, the disclosure of which is incorporated herein by reference.

TECHNICAL FIELD

The present disclosure relates to a multi-input charging system and method using a motor driving device, and more specifically, to a system and method for charging a battery using external charging power.

BACKGROUND

In general, electric vehicles or plug-in hybrid vehicles convert electric power provided from external charging equipment into a state suitable for charging in-vehicle batteries and provide the same to the batteries to charge the batteries.

Conventionally, charging equipment for quick charging has been manufactured such that it outputs a single voltage of 500 V, but batteries used in vehicles tend to be designed to have a voltage of 800 V or higher to improve efficiency and range.

Accordingly, some quick charging equipment has a voltage of 1000 V, and 1000 V quick charging equipment can charge an 800 V battery by decreasing the voltage to a voltage suitable for the battery. However, in order to charge an 800 V battery using charging equipment having a voltage of 500 V, a boost converter for boosting a voltage provided from external charging equipment is required.

However, a large-capacity boost converter for boosting 500 V to 800 V or higher is not only very heavy and bulky but also expensive, and thus it is difficult to install the boost converter in a vehicle and a vehicle price may increase due to the boost converter.

Accordingly, vehicles use a coil of a motor and a power conversion switch of an inverter as a boost converter for boosting a voltage. In order to control the voltage of an output stage of a quick charger, the output voltages of a battery and the quick charger are monitored, a duty is calculated, and then inverter 3-phase top and bottom switches are switched at a ratio corresponding to the duty.

In addition, when it is not necessary to drop or boost a voltage, external charging equipment and a battery of a vehicle can be directly connected for charging. A charging switch may be used for such direct connection and voltage drop or voltage boosting for charging.

However, when it is difficult to connect such a charging switch due to fusion cutting or a control error, there is a problem in that it is impossible to directly connect the external charging equipment to the battery of the vehicle and charge the battery.

The matters described as the background art above are only for improving the understanding of the background of the present disclosure and should not be taken as acknowledging that they correspond to the prior art already known to those of ordinary skill in the art.

SUMMARY OF THE DISCLOSURE

The present disclosure has been made in view of the above problems, and it is an object of the present disclosure to provide technology for allowing external charging power to be bypassed and directly applied to a battery through unique operation control of a switching element of an inverter even when a charging switch cannot be connected.

In accordance with the present disclosure, the above and other objects can be accomplished by the provision of a multi-input charging system using a motor driving device, which includes a motor having a plurality of windings respectively corresponding to a plurality of phases, a first inverter including a plurality of first switching elements and having a first end connected to a charging power input terminal to which charging power is inputted from the outside, and a second end connected to a first end of each of the plurality of windings, a second inverter including a plurality of second switching elements and having a first end connected to a second end of each of the plurality of windings, a battery connected to the charging power input terminal or a second end of the second inverter through a charging switch, and a controller configured to directly charge the battery through the charging power input terminal by selectively connecting the charging switch when a battery charging mode is started, and when connection of the charging switch is impossible, control the first switching elements and the second switching elements such that the charging power input terminal and the battery are connected through the first inverter, the motor, and the second inverter in a bypass manner.

The controller may directly charge the battery through the charging power input terminal by connecting the charging switch when the battery charging mode is started and voltage drop of the charging power is not required, and when voltage drop of the charging power is required, the controller may release the charging switch, drop the voltage through the first inverter and the second inverter, and charge the battery with the dropped voltage.

The controller may attempt to connect the charging switch when voltage drop of the charging power is not required, and when connection of the charging switch is impossible, the controller may control the first switching elements and the second switching elements such that the charging power input terminal and the battery are connected through the first inverter, the motor, and the second inverter in a bypass manner.

The controller may connect top switching elements of the first and second switching elements such that the charging power input terminal and the battery are connected through the top switching elements of the first inverter, the motor, and the top switching elements of the second inverter in a bypass manner when connection of the charging switch is impossible.

The charging switch may be arranged between the charging power input terminal and the battery, and the second end of the second inverter may be connected between the charging switch and the battery.

The controller may drop the voltage of the charging power through the first inverter, the motor, and the second inverter and charge the battery with the dropped voltage when the voltage of the charging power is equal to or greater than a voltage level preset to a battery chargeable level.

When the controller drops the voltage of the charging power and charges the battery with the dropped voltage, the controller may perform pulse width modulation control such that the plurality of first switching elements included in the first inverter is turned on/off depending on a duty ratio.

When the controller drops the voltage of the charging power and charges the battery with the dropped voltage, the controller may perform control such that top switching elements among the plurality of second switching elements included in the second inverter are connected.

In accordance with another aspect of the present disclosure, there is provided a multi-input charging method using the multi-input charging system using a motor driving device including receiving, by the controller, a voltage of charging power input to the charging power input terminal, determining whether to directly charge the battery or to drop the received voltage of the charging power and charge the battery with the dropped voltage based on the voltage of the charging power received by the controller, connecting the charging switch through the controller when the battery is directly charged through the charging power input terminal according to a determination result, and controlling the first switching elements and the second switching elements, by the controller, such that the charging power input terminal and the battery are connected through the first inverter, the motor, and the second inverter in a bypass manner when connection of the charging switching is impossible.

The connecting of the charging power input terminal and the battery through the first inverter, the motor, and the second inverter in a bypass manner may include connecting top switching elements of the first and second switching elements, by the controller, such that the charging power input terminal and the battery are connected through the top switching elements of the first inverter, the motor, and the top switching elements of the second inverter in a bypass manner.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
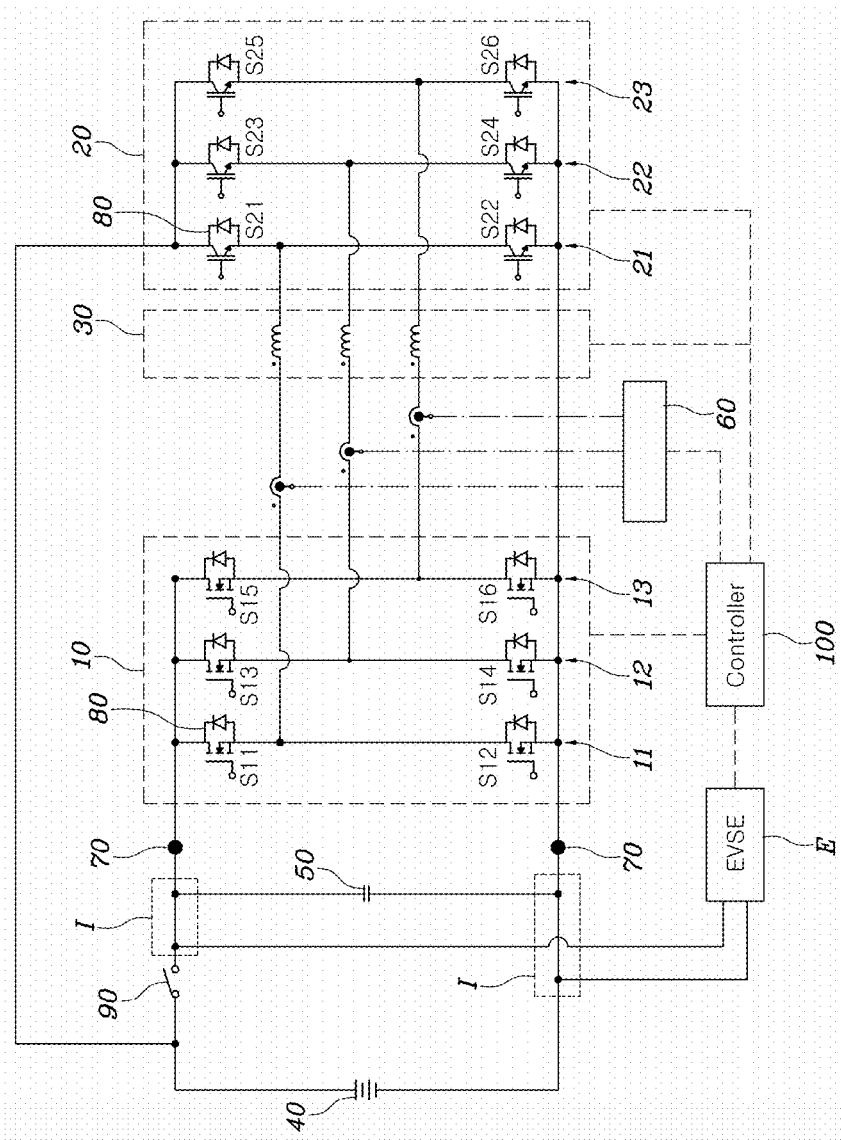
FIG. 1 shows a configuration of a multi-input charging system using a motor driving device according to an embodiment of the present disclosure.

Specific structural and functional descriptions of embodiments of the present disclosure disclosed in the present specification or application are illustrated for the purpose of describing embodiments according to the present disclosure, and embodiments according to the present disclosure may be implemented in various forms and should not be construed as being limited to the embodiments described in the present specification and application.

While embodiments according to the present disclosure are susceptible to various modifications and alternative forms, specific embodiments are shown by way of example in the drawings. However, the present disclosure should not be construed as limited to the embodiments set forth herein, but on the contrary, the present disclosure is to cover all modifications, equivalents, and alternatives falling within the spirit and scope of the present disclosure.

The terms "first" and/or "second" are used to describe various components, but such components are not limited by these terms.

The terms are used to discriminate one component from another component. For example, a first component may be called a second component and the second component may be called the first component within the technical spirit of the present disclosure.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components. Further, other representations describing a relationship between components, that is, "between", "immediately between", "adjacent to" and "directly adjacent to" should be construed likewise.

The terms used in the specification of the present disclosure are merely used in order to describe particular embodiments, and are not intended to limit the scope of the present disclosure. An element described in the singular form is intended to include a plurality of elements unless the context clearly indicates otherwise. In the specification of the present disclosure, it will be further understood that the term "comprise" or "include" specifies the presence of a stated feature, figure, step, operation, component, part or a combination thereof, but does not preclude the presence or addition of one or more other features, figures, steps, operations, components, or combinations thereof.

All the terms that are technical, scientific or otherwise agree with the meanings as understood by a person skilled in the art unless defined to the contrary. Common terms as found in dictionaries should be interpreted in the context of the related technical writings not too ideally or impractically unless expressly disclosed herein.

Hereinafter, preferred embodiments of the present disclosure will be described in detail with reference to the attached drawings. Throughout the drawings, the same reference numerals represent the same members.

Figure 2:
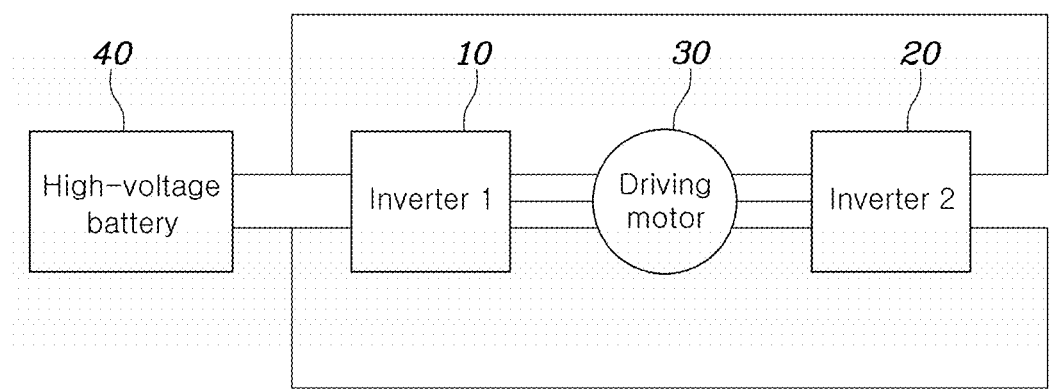
FIG. 2 schematically illustrates the multi-input charging system using a motor driving device according to an embodiment of the present disclosure.

FIG. 1 shows a configuration of a multi-input charging system using a device for driving a motor 30 according to an embodiment of the present disclosure, and FIG. 2 schematically illustrates the multi-input charging using the device for driving the motor 30 according to an embodiment of the present disclosure.

Referring to FIG. 1 and FIG. 2, the multi-input charging system using the device for driving the motor 30 according to an embodiment of the present disclosure includes: the motor 30 having a plurality of windings respectively corresponding to a plurality of phases; a first inverter 10 including a plurality of first switching elements and having a first end connected to a charging power input terminal I to which charging power is input from the outside and a second end connected to a first end of each of the plurality of windings;

a second inverter 20 including a plurality of second switching elements and having a first end connected to a second end of each of the plurality of windings; a battery 40 connected to the charging power input terminal I or a second end of the second inverter 20; and a controller 100 that directly charges the battery 40 through the charging power input terminal I on the basis of the voltage level of charging power input to the charging power input terminal I when a charging mode for charging the battery 40 is started or drops the voltage of the charging power through the first inverter 10 and the second inverter 20 and charges the battery 40 with the dropped voltage.

In particular, the controller 100 directly charges the battery 40 through the charging power input terminal I by selectively connecting a charging switch 90 when the battery charging mode is started. However, if connection of the charging switch 90 is impossible in this process, the first switching elements and the second switching elements are controlled such that the charging power input terminal I and the battery 40 are connected through the first inverter 10, the motor 30, and the second inverter 20.

The controller 100 according to an exemplary embodiment of the present disclosure may be implemented through a non-volatile memory (not shown) configured to store an algorithm configured to control operations of various components of a vehicle or data regarding software instructions for reproducing the algorithm, and a processor (not shown) configured to perform operations described below using data stored in the memory. Here, the memory and the processor may be implemented as individual chips. Alternatively, the memory and the processor may be implemented as a single integrated chip. The processor may take the form of one or more processors.

In general, one end of each phase winding included in the motor 30 is connected to one inverter and the other ends of the phase windings are connected to form a Y-connection.

At the time of driving the motor 30, a switching element in an inverter is turned on/off according to pulse width modulation control to apply a line voltage to the Y-connected windings of the motor 30 to generate an alternating current, resulting in generation of a torque. The AC output limit voltage of the inverter is proportional to the DC voltage level of the high-voltage battery 40.

Since the fuel efficiency of eco-friendly vehicles such as electric vehicles using the torque generated by the motor 30 as power is determined by the power conversion efficiency of the inverter and the motor 30, it is important to maximize the power conversion efficiency of the inverter and the efficiency of the motor 30 for fuel efficiency improvement.

In the present disclosure, in order to increase the output of the motor 30 based on the same battery voltage to improve the acceleration performance of electric vehicles, an open-end winding motor 30/dual inverter structure sharing the same battery 40 is used, as shown in FIG. 2.

When switching is performed using a dual inverter, up to twice the phase voltage of the motor 30 can be used as compared to the conventional SVPWM. In a region above the base rpm where the torque is limited, the dual inverter has larger available current than that of a single inverter and thus can produce higher output. In the case of the dual inverter, the neutral end of the Y connection of the motor 30 is connected to the three-phase inputs of the second inverter, and in this case, the motor 30 is called an open-end winding motor 30.

A quick charging method for the battery 40 converts AC power input from the outside into DC through a quick charger E, controls the current, and directly charges the battery 40 with high power, and 50 kW, 100 kW, 200 kW and 400 kW infrastructure may exist. In particular, the charging power input terminal has an output voltage of 500 V or 1000 V.

A quick charging method using a charging power input terminal I having output voltages of 500 V and 1000 V is referred to as a multi-input charging method.

Specifically, a vehicle uses the coil of the motor 30 and a power conversion switch of an inverter as a boost converter or a buck converter for voltage boosting. In particular, in order to control the voltage of the charging power input terminal I, the output voltages of the battery 40 and the quick charger E are monitored, a duty is calculated, and then inverter 3-phase top and bottom switches are switched at a rate corresponding to the duty.

Referring back to FIG. 1, the first inverter 10 and the second inverter 20 may convert DC power stored in the battery 40 into 3-phase AC power and provide the same to the motor 30 or may convert regenerative braking energy generated due to generation of regenerative braking torque of the motor 30 during regenerative braking into direct current and provide the same to the battery 40. Such conversion between the DC power and the AC power may be performed by pulse width modulation control of a plurality of first switching elements S11 to S16 and a plurality of second switching elements S21 to S26 included in the first inverter 10 and the second inverter 20.

The first inverter 10 may include a plurality of legs 11 to 13 to which a DC voltage generated in a DC link capacitor 50 connected between both ends of the battery 40 is applied. The legs 11 to 13 may respectively correspond to the plurality of phases of the motor 30 to form electrical connections.

More specifically, the first leg 11 may include two switching elements S11 and S12 connected in series between both ends of the DC capacitor 50, and the connection node of the two switching elements S11 and S12 may be connected to one end of the winding C1 of one phase in the motor 30 such that AC power corresponding to one of the plurality of phases is input/output.

Similarly, the second leg 12 may include two switching elements S13 and S14 connected in series between both ends of the DC capacitor 50, and the connection node of the two switching elements S13 and S14 may be connected to one end of the winding C2 of one phase in the motor 30 such that AC power corresponding to one of the plurality of phases is input/output.

In addition, the third leg 13 may include two switching elements S15 and S16 connected in series between both ends of the DC capacitor 50, and the connection node of the two switching elements S15 and S16 may be connected to one end of the winding C3 of one phase in the motor 30 such that AC power corresponding to one of the plurality of phases is input/output.

The second inverter 10 may have a configuration similar to that of the first inverter 10. The second inverter 20 may include a plurality of legs 21 to 23. The legs 21 to 23 may respectively correspond to the plurality of phases of the motor 30 to form electrical connections.

More specifically, the first leg 21 may include two switching elements S21 and S22 connected in series, and the connection node of the two switching elements S21 and S22 may be connected to the other end of the winding C1 of one phase in the motor 30 such that AC power corresponding to one of the plurality of phases is input/output.

Similarly, the second leg 22 may include two switching elements S23 and S24 connected in series, and the connection node of the two switching elements S23 and S24 may be connected to the other end of the winding C2 of one phase in the motor 30 such that AC power corresponding to one of the plurality of phases is input/output.

In addition, the third leg 23 may include two switching elements S25 and S26 connected in series, and the connection node of the two switching elements S25 and S26 may be connected to the other end of the winding C3 of one phase in the motor 30 such that AC power corresponding to one of the plurality of phases is input/output.

The first inverter 10 is connected to one end of each of the windings C1-C3 of the motor 30 and the second inverter 20 is connected to the other end of each of the windings C1-C3 of the motor 30. That is, both ends of the windings C1 to C3 of the motor 30 may be electrically connected to the first inverter 10 and the second inverter 20 through an open-end winding method.

The battery 40 may be simultaneously connected to the charging power input terminal I, the DC capacitor 50, the first inverter 10, and the second inverter 20. When the battery 40 is directly connected to the charging power input terminal I, the battery 40 may be directly charged through the charging power input terminal I.

Alternatively, when the battery 40 is disconnected from the charging power input terminal I, the battery 40 may be charged with a voltage dropped through the first inverter 10, the motor 30, and the second inverter 20. The first inverter 10, the motor 30, and the second inverter 20 may be used as a step-down converter.

The controller 100 may perform control such that the battery 40 is directly charged through the charging power input terminal I or the voltage of charging power is dropped through the first inverter 10 and the second inverter 20 and the battery 40 is charged with the dropped voltage.

More specifically, when the charging mode for charging the battery 40 is started, the controller 100 may determine whether to directly charge the battery 40 based on the voltage level of the charging power input to the charging power input terminal I or drop the voltage of the charging power and charge the battery 40 with the dropped voltage.

In one embodiment, the charging switch 90 is arranged between the charging power input terminal I and the battery 40, and the controller 100 can directly charge the battery 40 through the charging power input terminal I or drop the voltage of the charging power through the first inverter 10 and the second inverter 20 and charge the battery 40 with the dropped voltage by controlling short-circuit (connection) of the charging switch 90.

The charging switch 90 may be located between the charging power input terminal I and the battery 40, connect the charging power input terminal I to the battery 40 when short-circuited, and cut off connection between the charging power input terminal I and the battery 40 when opened.

Specifically, the charging power input terminal I can be connected to the battery 40 through the charging switch 90 and simultaneously connected to the first inverter 10. The charging power input terminal I may be connected to the first inverter 10.

When the charging mode is started, the controller 100 may drop the voltage of the charging power through the first inverter 10 and the second inverter 20 and charge the battery 40 with the dropped voltage when the voltage level of the charging power is equal to or greater than a voltage preset to a level that can charge the battery 40.

In one embodiment, the voltage of the charging power applied to the charging power input terminal I may be 500 V or 1000 V. The voltage of the battery 40 may be 400 V or 800 V.

Here, when the voltage of the battery 40 is 400 V and the voltage of the charging power is 1000 V, the controller 100 can drop the voltage of the charging power and charge the battery 400 with the dropped voltage. In another embodiment, when the voltage of the charging power is 500 V, the battery 40 can be directly charged through the charging power input terminal I.

For example, the voltage may be preset to a level between 500 V and 1000 V. That is, when the voltage level of the charging power is 1000 V, which is equal to or greater than the preset voltage, the controller 100 may charge the battery 40 with the voltage dropped through the first inverter 10 and the second inverter 20.

FIG. 3 to FIG. 6 illustrate control of the first switching elements according to an embodiment of the present disclosure.

Referring to FIG. 3 to FIG. 6, the controller 100 may perform pulse width modulation (PWM) control to turn on/off the plurality of first switching elements included in the first inverter 10 according to a duty ratio.

Here, IGBT 1 may be top switching elements S11, S13, and S15) among the plurality of first switching elements included in the first inverter 10, and IGBT 2 may be bottom switching elements S12, S14, and S16.

The controller 100 may drop a charging voltage Vin of the charging power input terminal I by alternately switching IGBT 1 and IGBT 2 included in the first inverter 10. Specifically, the controller 100 may switch IGBT 1 and IGBT 2 to turn on IGBT 1 and turn off IGBT 2 or to turn off IGBT 1 and turn on IGBT 2.

Figure 3:
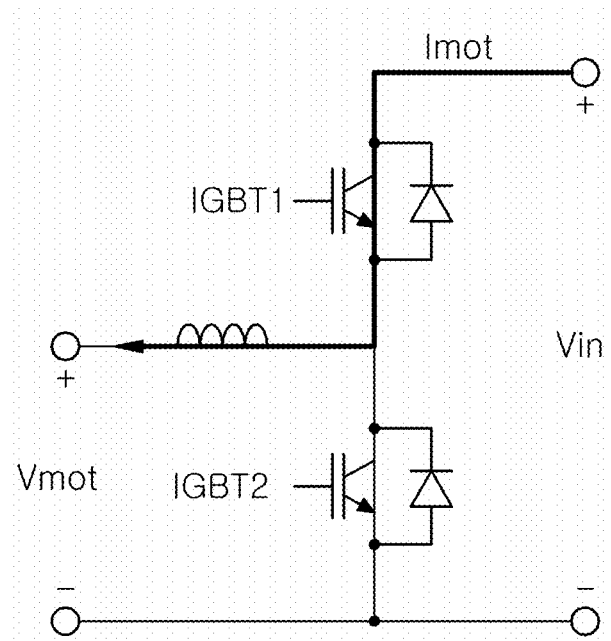
FIGS. 3, 4, 5, and 6 illustrate control of a first switching element according to an embodiment of the present disclosure.

As shown in FIG. 3, when IGBT 1 is turned on and IGBT 2 is turned off, energy can be stored in inductors located in the windings of the motor 30 according to the charging voltage Vin of the charging power input terminal I.

Figure 4:
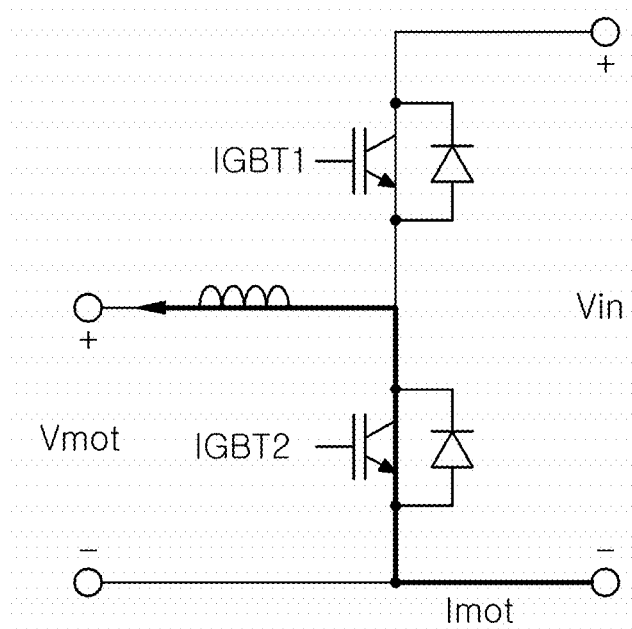

Further, as shown in FIG. 4, when IGBT 1 is turned off and IGBT 2 is turned on, the energy stored in the inductors can be discharged.

Figure 5:
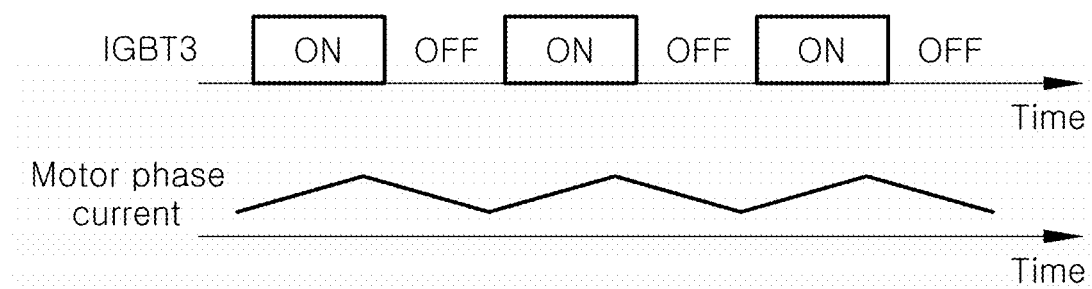
Figure 6:
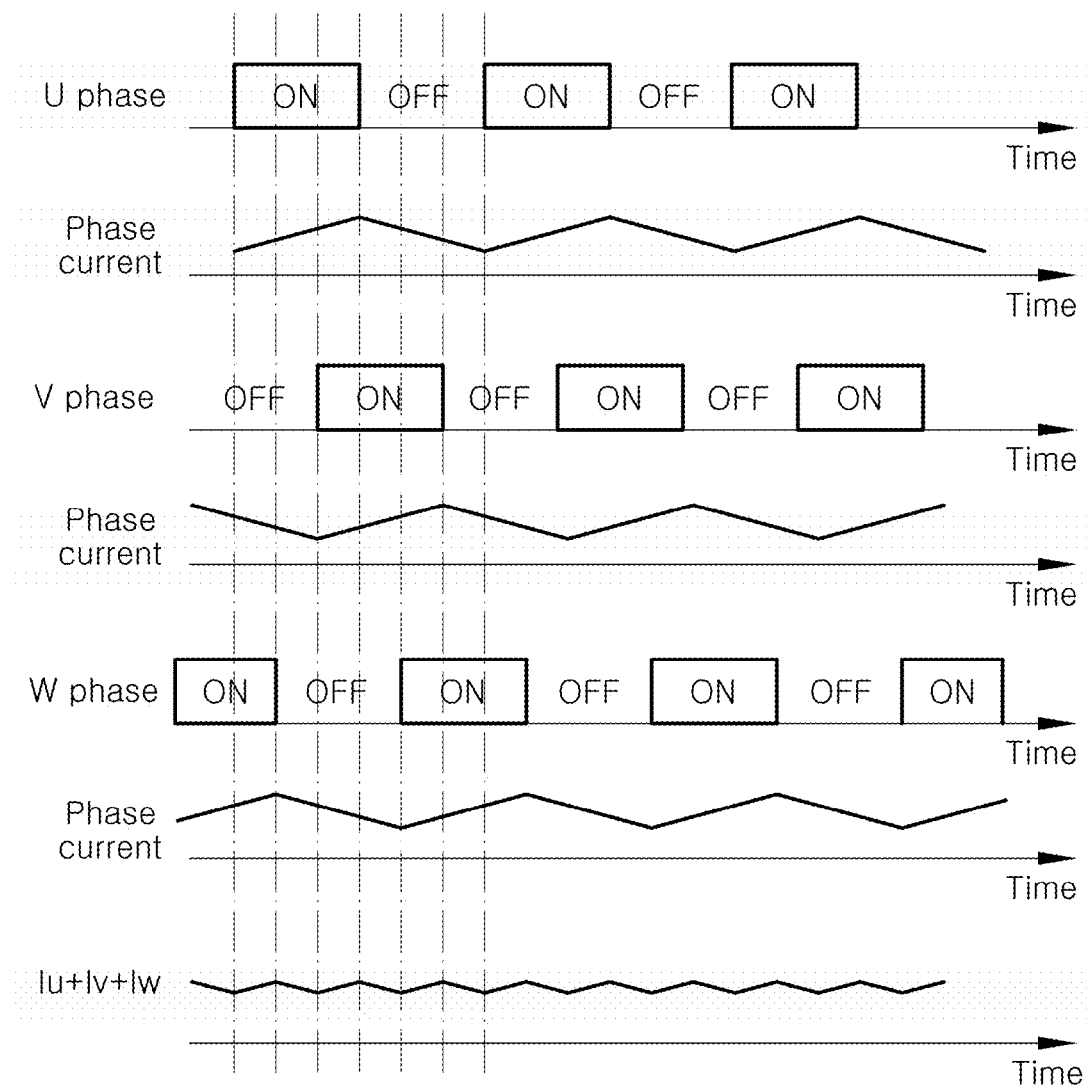

As shown in FIG. 5, the controller 100 may control IGBT 1 corresponding to top switching elements S11, S13, and S15 among the plurality of first switching elements included in the first inverter 10 such that they are turned on/off depending on a duty ratio.

The phase currents (U phase, V phase, and W phase) of the motor 30 can increase in a state in which IGBT 1 is turned on and decrease in a state in which IGBT 1 is turned off.

More specifically, the controller 100 may set the duty ratio of the top switching elements among the plurality of first switching elements to a ratio of the voltage of the battery 40 to the voltage of the charging power.

In particular, the controller 100 may set the duty ratio D for turning on IGBT 1, which is the top switching elements S11, S13, and S15 included in the plurality of first switching elements, to the ratio of the voltage Vbat of the battery 40 to the voltage Vin of the charging power. Here, the duty ratio D may be a ratio of a switching period (on duration+off duration) to an on duration.

$$D = Vbat/Vin$$

Additionally, as shown in FIG. 5, the controller 100 may control the plurality of first switching elements respectively connected to the three phases of the motor 30 in a 3-phase interleaving manner.

Specifically, the controller 100 may control the top switching elements S11, S13, and S15 and the bottom switching elements S12, S14, and S16 connected to the U phase, V phase and W phase of the motor 30 in an interleaving manner at an interval of one third of the switching period. Accordingly, change in the sum of the phase currents for the three phases of the motor 30 is minimized and ripples in the current of the battery 40 are minimized.

Figure 7:
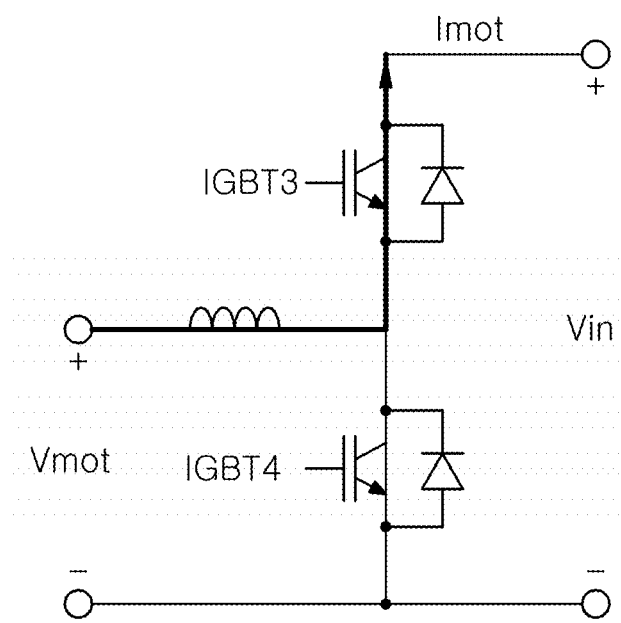
FIG. 7 illustrates control of a second switching element according to an embodiment of the present disclosure.

FIG. 7 illustrates control of the second switching elements according to an embodiment of the present disclosure.

Referring further to FIG. 7, the controller 100 may control the top switching elements among the plurality of second switching elements included in the second inverter 20 to be turned on.

Here, IGBT 3 may be top switching elements S21, S23, and S25 among the plurality of second switching elements included in the second inverter 20, and IGBT 4 may be bottom switching elements S22, S24, and S26.

The controller 100 may control the top switching elements S21, S23, and S25 among the plurality of second switching elements included in the second inverter 20 to be turned on, and thus can transfer the inductor energy of the motor 30 to the battery 40.

Here, the controller 100 may control the bottom switching elements S22, S24, and S26 among the plurality of second switching elements to be turned off.

On the other hand, when voltage drop is not required, that is, when the voltage of the battery 40 and the voltage of the charging power are within the same voltage range, the battery 40 can be directly charged with the charging power without voltage conversion. For this, the controller 100 may connect the charging switch 90 and turn off both the first inverter 10 and the second inverter 20.

However, in this case, the charging switch 90 may fail or connection of the charging switch 90 may not be possible due to a control error or a communication error. The controller 100 can easily check whether the charging switch 90 is connected through various means such as other additional current sensors or voltage sensors.

Figure 8:
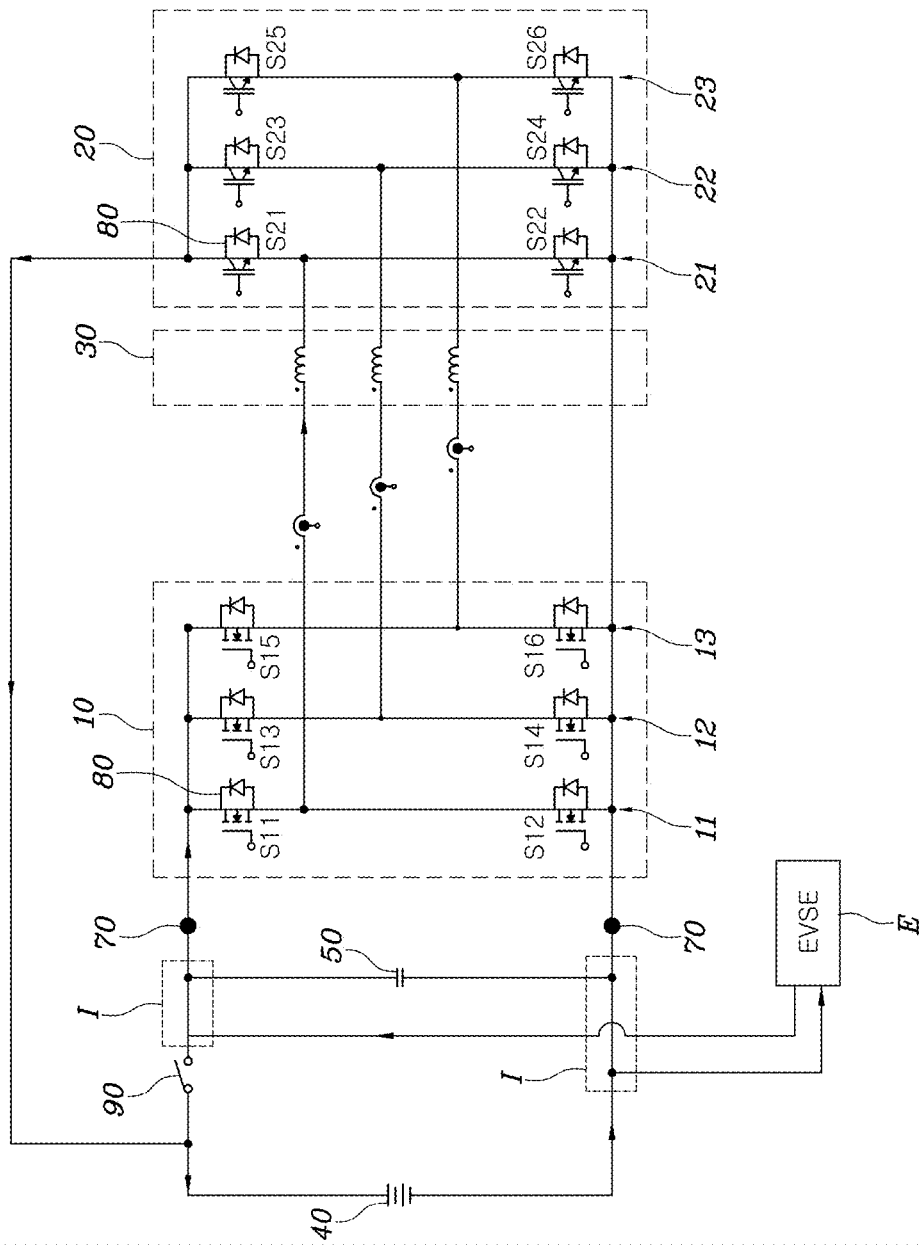
FIG. 8 illustrates a state in which the voltage of charging power is dropped through a first inverter and a second inverter to charge a battery according to an embodiment of the present disclosure.

In this case, the charging switch 90 is in a released state as in the case of FIG. 8, and in this state, the controller 100 performs control such that the top switching elements S11, S13, and S15 among the first switching elements of the first inverter 10 are connected, the bottom switching elements S12, S14, and S16 are released, the top switching elements S21, S23, and S25 among the second switching elements of the second inverter 20 are also connected, and the bottom switching elements S22, S24, and S26 are released. Accordingly, the charging power can be directly applied to the battery 40 through the top switching elements S11, S13, and S15 of the first switching elements, the motor 30, and the top switching elements S21, S23, and S25 of the second switching elements while bypassing the opened charging switch 90 to charge the battery 40 without voltage drop. Therefore, even when the charging switch 90 fails, direct charging can be stably performed, thereby ensuring charging efficiency.

Meanwhile, the controller 100 may diagnose whether the motor 30, the first inverter 10, or the second inverter 20 has failed and may directly charge the battery 40 through the charging power input terminal I when failure is diagnosed.

Specifically, the controller 100 may diagnose whether the motor 30, the first inverter 10, or the second inverter 20 has failed, and if no failure occurs, drop the charging voltage of the charging power input terminal I through the motor 30, the first inverter 10, or the second inverter 20 and charge the battery with the dropped voltage.

On the other hand, the controller 100 may directly charge the battery 40 through the charging power input terminal I upon diagnosing failure of the motor 30, the first inverter 10, or the second inverter 20.

Accordingly, the controller 100 can continuously diagnose the state of the motor 30, the first inverter 10, or the second inverter 20, and simultaneously stably charge the battery 40.

In one embodiment, a current sensor 60 for sensing the phase currents flowing through the plurality of phases of the motor 30 may be further provided in the plurality of windings of the motor 30, and the controller 100 may diagnose whether the motor 30, the first inverter 10, or the second inverter 20 has failed on the basis of the phase currents sensed by the current sensor 60 and the input current of the battery 40.

The current sensor 60 is disposed in each of the plurality of windings corresponding to the three phases (U-phase, V-phase, and W-phase) of the motor 30 and may sense phase currents flowing through the plurality of phases. The controller 100 may determine whether the sum $Iu+Iv+Iw$ of the phase currents flowing through the plurality of phases sensed by the current sensor 60 is equal to the input current $Ibat$ of the battery 40 and diagnose failure of the current sensor 60 according to the determination result.

In addition, a voltage sensor 70 for sensing the voltage of the battery 40 may be further provided.

In another embodiment, a temperature sensor 80 included in the plurality of first switching elements or the plurality of second switching elements and sensing a temperature is further provided, and the controller 100 may diagnose whether the motor 30, the first inverter 10, or the second inverter 20 has failed on the basis of the temperature sensed by the temperature sensor 80.

The temperature sensor 80 may be provided in each of the plurality of first switching elements and the plurality of second switching elements included in the first inverter 10 and the second inverter 20. When the temperature sensed by the temperature sensor 80 is equal to or greater than a preset limit temperature, the controller 100 may diagnose that overtemperature has been generated in the first inverter 10 and the second inverter 20.

Figure 9:
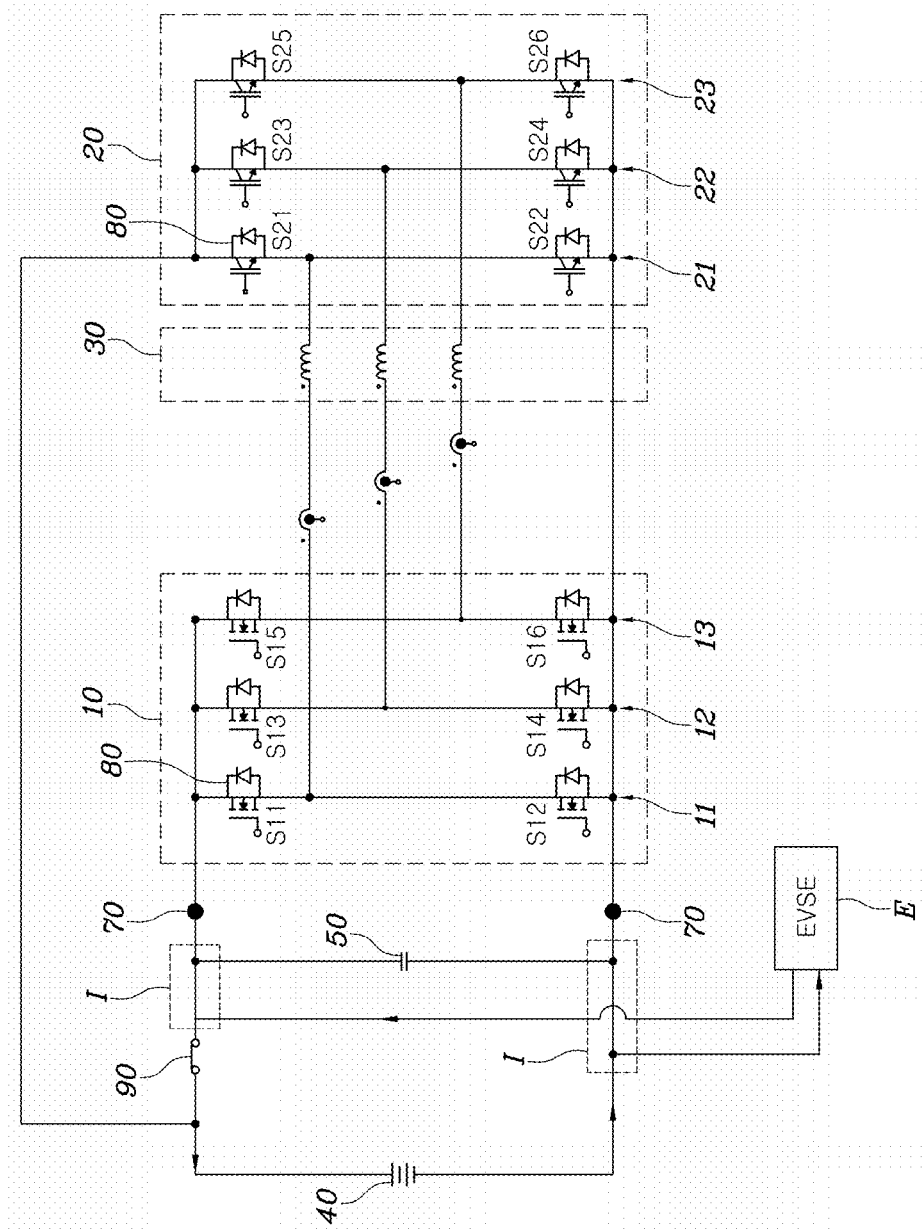
FIG. 9 illustrates a state in which a battery is directly charged through a charging power input terminal according to an embodiment of the present disclosure.

FIG. 8 shows a state in which the voltage of the charging power is dropped through the first inverter 10 and the second inverter 20 and the battery 40 is charged with the dropped voltage according to an embodiment of the present disclosure, and FIG. 9 shows a state in which the battery 40 is directly charged through the charging power input terminal I according to an embodiment of the present disclosure.

As shown in FIG. 8, when the controller 100 opens the charging switch 90, the power input to the charging power input terminal I can be decreased while sequentially passing through the motor 30, the first inverter 10, and the second inverter 20 and charge the battery 40.

For example, when the power is decreased while sequentially passing through the motor 30, the first inverter 10, and the second inverter 20 and charges the battery 40, the power $Pin$ of the quick charger E may be the product of the charging voltage and the charging current ($Pin=Vin \times Iin$), the input power $Pbat$ of the battery 40 may be the product of the voltage and the input current of the battery 40 ($Pbat=Vbat \times Ibat$), and the input power $Pbat$ of the battery 40 may be a value obtained by multiplying the power $Pin$ of the quick charger E by power conversion efficiency η of the first inverter 10 and the second inverter 20. Accordingly, when the voltage of the charging power is dropped and the battery 40 is charged with the dropped voltage, the input current Ibat of the battery 40 can be calculated as follows.

$$Ibat=(Vin \times Iin \times \eta)/Vbat$$

As shown in FIG. 9, when the controller 100 short-circuits the charging switch 90, the battery 40 may be directly charged through the charging power input terminal I. In this case, pulse width modulation control or switching control of the first inverter 10 and the second inverter 20 may be turned off.

For example, when the battery 40 is directly charged through the charging power input terminal I, the input current Ibat' of the battery 40 is the same as the charging current Iin, and thus the input power Pbat' of the battery 40 can be calculated as the product of the charging voltage and the charging current Iin of the battery 40 (Pbat'=Vbat× Ibat'=Vbat×Iin).

Accordingly, the ratio between the input power Pbat or the input current Ibat of the battery 40 when the voltage of the charging power is dropped through the motor 30, the first inverter 10, and the second inverter 20 and the battery 40 is charged with the dropped voltage and the input power Pbat' or the input current Ibat' when the battery 40 is directly charged through the charging power input terminal I is as follows.

$$Pbat/Pbat'=Ibat/Ibat'=Vin \times \eta/Vbat$$

For example, if the charging voltage Vin is 800 V, the voltage Vbat of the battery 40 is 400 V, and the power conversion efficiency η of the motor 30, the first inverter 10 and the second inverter 20 is 90%, the ratio of the charging power of the battery 40 or the input current of the battery 40 is calculated as 180%. That is, in case of charging the battery 40 by dropping the voltage through the motor 30, the first inverter 10, and the second inverter 20, the charging power and the input current of the battery 40 may increase by 180% as compared to a case where the battery 40 is directly charged through the charging power input terminal I.

If the battery can be charged directly, but the charging switch 90 cannot be connected due to failure of the charging switch 90, the charging power may be directly applied to the battery 40 through the top switching elements S11, S13, and S15 among the first switching elements, the motor 30, and the top switching elements S21, S23, and S25 among the second switching elements while bypassing the opened charging switch 90, as described above.

Figure 10:
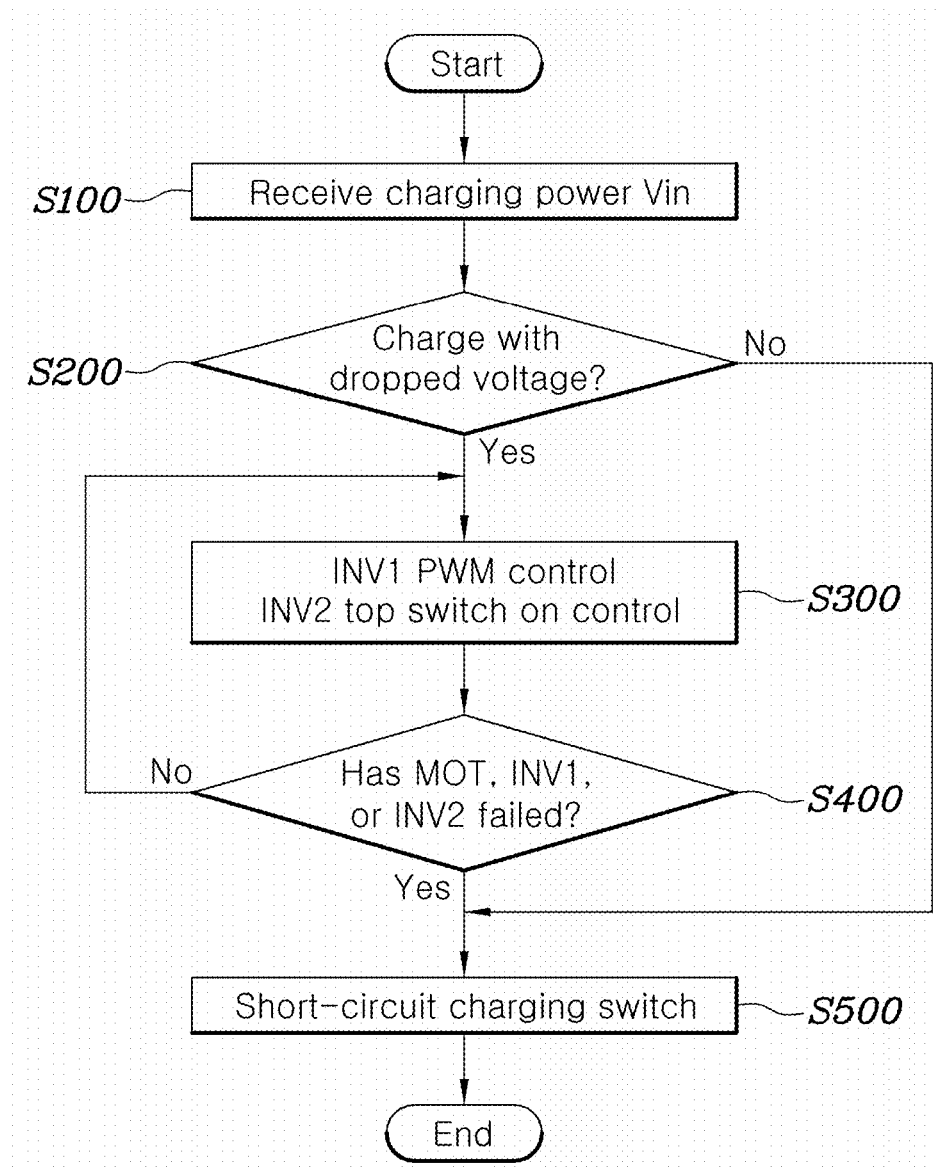
FIG. 10 and FIG. 11 are flowcharts of a multi-input charging method using a motor driving device according to an embodiment of the present disclosure.
Figure 11:
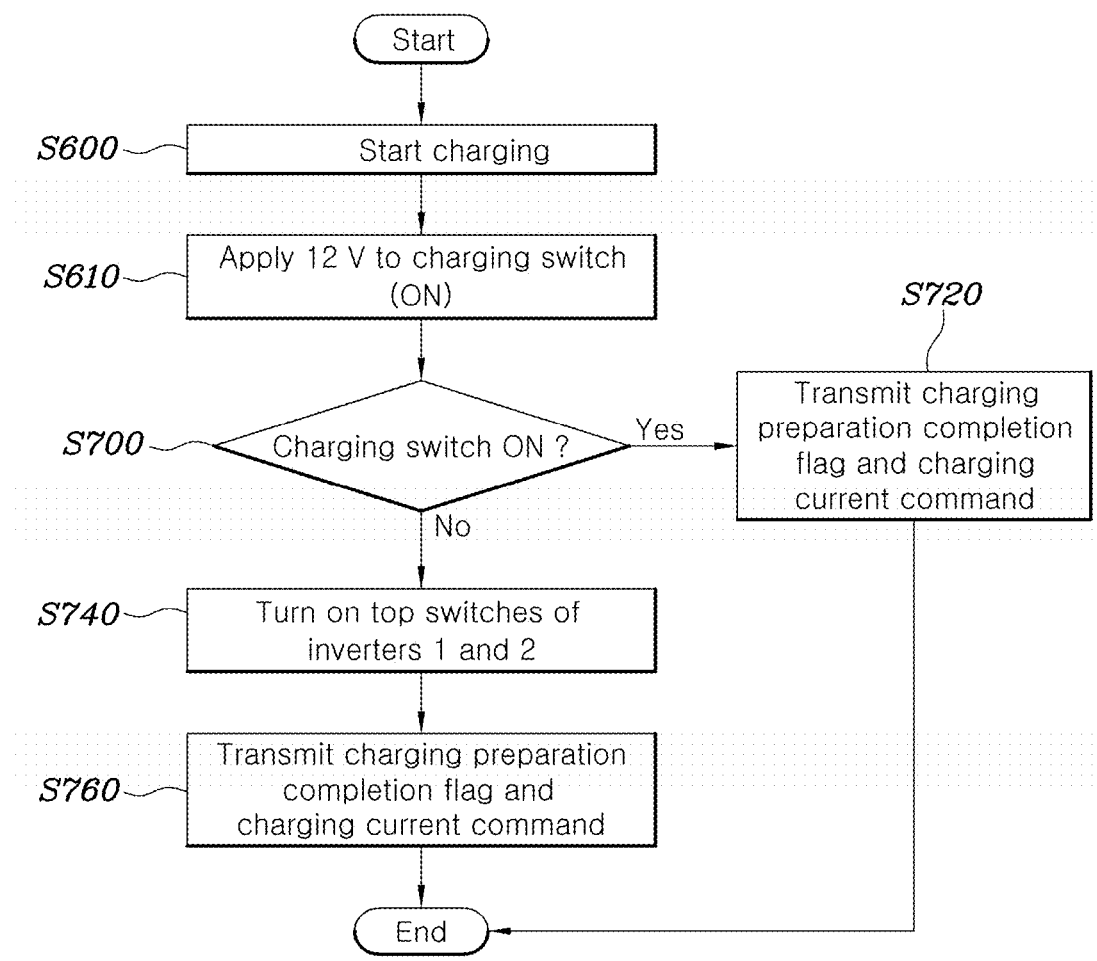

FIG. 10 is a flowchart of a multi-input charging method using a motor driving device according to an embodiment of the present disclosure, and FIG. 11 is a flowchart related to failure of the charging switch.

Referring to FIG. 10, the multi-input charging method according to an embodiment of the present disclosure is a charging method using a multi-input charging system using a motor driving device, which includes a step S100 of receiving the voltage of charging power input to the charging power input terminal I, a step S200 of determining whether to directly charge the battery 40 or drop the voltage of the charging power and charge the battery 40 with the dropped voltage on the basis of the received voltage of the charging power, and a step S300 of directly charging the battery 40 through the charging power input terminal I or dropping the voltage of the charging power through the first inverter 10 and the second inverter 20 and charging the battery 40 with the dropped voltage on the basis of the determination result.

In the step S300 of charging the battery 40, the battery 40 can be charged directly through the charging power input terminal I or the voltage of the charging power can be dropped through the first inverter 10 and the second inverter 20 and the battery 40 can be charged with the dropped voltage by controlling whether the charging switch 90 arranged between the charging power input terminal I and the battery 40 is short-circuited.

In the step S300 of charging the battery 40, pulse width modulation may be controlled to turn on/off the plurality of first switching elements included in the first inverter 10 according to a duty ratio, and the top switching elements among the plurality of second switching elements included in the second inverter 20 may be controlled to be turned on.

The multi-input charging method may further include a step S400 of diagnosing whether the motor 30, the first inverter 10, or the second inverter 20 has failed, and a step S500 of directly charging the battery 40 through the charging power input terminal I at the time of diagnosing a failure after the step S300 of charging the battery 40.

In the step S400 of diagnosing failure, phase currents flowing through the plurality of windings of the motor 30 may be sensed and failure of the motor 30, the first inverter 10, or the second inverter 20 may be diagnosed on the basis of the sensed phase currents and input current of the battery 40, or the temperature of the plurality of first switching elements or the plurality of second switching elements may be sensed and a failure of the motor 30, the first inverter 10, or the second inverter 20 may be diagnosed on the basis of the sensed temperature.

Meanwhile, when the battery can be directly charged but the charging switch has failed, as shown in FIG. 11, connection of the charging switch is attempted when charging is started (S600 and S610), direct charging is performed if connection of the charging switch is possible (S700 and S720), and the top switching elements of the first inverter and the second inverter are connected such that direct charging can be performed through bypassing if connection of the charging switch is impossible (S740 and S760).

Although specific embodiments of the present disclosure have been disclosed for illustrative purposes, those skilled in the art will appreciate that various modifications, additions and substitutions are possible, without departing from the scope and spirit of the disclosure as disclosed in the accompanying claims.

According to the multi-input charging system and method using a motor driving device of the present disclosure, a charging speed of a battery can be improved by controlling voltage drop using a motor and a dual inverter when high-voltage external charging power is used.

At the same time, even when the charging switch fails, top switching elements of inverters are connected such that external charging power can be bypassed and directly applied to the battery, and thus the charging system can be stably maintained and charging efficiency can be improved.

What is claimed is:

1. A multi-input charging system using a motor driving device, comprising:
   a motor having a plurality of windings respectively corresponding to a plurality of phases;
   a first inverter including a plurality of first switching elements and having a first end connected to a charging power input terminal to which charging power is inputted from outside, and a second end connected to a first end of each of the plurality of windings;
   a second inverter including a plurality of second switching elements and having a first end connected to a second end of each of the plurality of windings;

a battery connected to the charging power input terminal or a second end of the second inverter through a charging switch; and a controller configured to connect the charging switch to directly charge the battery through the charging power input terminal based on a voltage of the charging power when a battery charging mode is started, or disconnect the charging switch and control the first switching elements and the second switching elements such that the charging power input terminal and the battery are connected through the first inverter, the motor, and the second inverter in a bypass manner, thereby charging the battery at a reduced voltage.

2. The multi-input charging system according to claim 1, wherein the controller directly charges the battery through the charging power input terminal by connecting the charging switch when the battery charging mode is started and voltage drop of the charging power is not required, and when voltage drop of the charging power is required, the controller releases the charging switch, drops a voltage of the charging power through the first inverter and the second inverter, and charges the battery with the dropped voltage.

3. The multi-input charging system according to claim 2, wherein the controller attempts to connect the charging switch when voltage drop of the charging power is not required, and when connection of the charging switch is impossible, the controller controls the first switching elements and the second switching elements such that the charging power input terminal and the battery are connected through the first inverter, the motor, and the second inverter in a bypass manner.

4. The multi-input charging system according to claim 1, wherein the controller connects top switching elements of the first and second switching elements such that the charging power input terminal and the battery are connected through the top switching elements of the first inverter, the motor, and the top switching elements of the second inverter in a bypass manner when connection of the charging switch is impossible.

5. The multi-input charging system according to claim 1, wherein the charging switch is arranged between the charging power input terminal and the battery, and the second end of the second inverter is connected between the charging switch and the battery.

6. The multi-input charging system according to claim 1, wherein the controller drops the voltage of the charging power through the first inverter, the motor, and the second inverter and charges the battery with the dropped voltage when a voltage of the charging power is greater than or equal to a voltage level preset to a battery chargeable level.

7. The multi-input charging system according to claim 6, wherein, when the controller drops the voltage of the charging power and charges the battery with the dropped voltage, the controller performs pulse width modulation control such that the plurality of first switching elements included in the first inverter is turned on/off depending on a duty ratio.

8. The multi-input charging system according to claim 6, wherein, when the controller drops the voltage of the charging power and charges the battery with the dropped voltage, the controller performs control such that top switching elements among the plurality of second switching elements included in the second inverter are connected.

9. A multi-input charging method using the multi-input charging system using the motor driving device of claim 1, comprising:

receiving, by the controller, a voltage of charging power input to the charging power input terminal;

determining whether to directly charge the battery or to drop the received voltage of the charging power and charge the battery with the dropped voltage based on the voltage of the charging power received by the controller;

connecting the charging switch through the controller when the battery is directly charged through the charging power input terminal according to a determination result; and controlling the first switching elements and the second switching elements, by the controller, such that the charging power input terminal and the battery are connected through the first inverter, the motor, and the second inverter in a bypass manner when connection of the charging switching is impossible.

10. The multi-input charging method according to claim 9, wherein the connecting of the charging power input terminal and the battery through the first inverter, the motor, and the second inverter in a bypass manner comprises connecting top switching elements of the first and second switching elements, by the controller, such that the charging power input terminal and the battery are connected through the top switching elements of the first inverter, the motor, and the top switching elements of the second inverter in a bypass manner.

* * * * *